US012608620B2

(12) United States Patent (10) Patent No.: US 12,608,620 B2

Mack (45) Date of Patent: Apr. 21, 2026

(54) METHOD AND DEVICE FOR PROCESSING DATA ASSOCIATED WITH A NEURAL NETWORK

(71) Applicant: Robert Bosch GmbH, Stuttgart (DE)

(72) Inventor: Frank Mack, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 831 days.

(21) Appl. No.: 17/931,672

(22) Filed: Sep. 13, 2022

(65) Prior Publication Data

US 2023/0090477 A1 Mar. 23, 2023

(30) Foreign Application Priority Data

Sep. 22, 2021 (DE) ...................... 10 2021 210 538.6

(51) Int. Cl.
*G06N 3/08* (2023.01)
*G06N 3/088* (2023.01)
*G06N 10/20* (2022.01)

(52) U.S. Cl.
CPC ............. *G06N 3/088* (2013.01); *G06N 10/20* (2022.01)

(58) Field of Classification Search
CPC ........ G06N 3/088; G06N 10/00; G06N 10/20; G06N 3/0455; G06N 3/045
See application file for complete search history.

(56) References Cited

U.S. PATENT DOCUMENTS

| | | | | |
|---|---|---|---|---|
| 2009/0113267 A1* | 4/2009 | Harrison | ............... | H03M 13/37 |
| | | | | 714/E11.002 |
| 2018/0060727 A1* | 3/2018 | Rainwater | .............. | G06N 3/045 |
| 2020/0005154 A1* | 1/2020 | Herbster | ................. | G06T 9/002 |
| 2020/0327440 A1* | 10/2020 | Cao | ........................... | G06N 3/08 |
| 2022/0292385 A1* | 9/2022 | Sauvage | ................ | G06N 10/60 |
| 2023/0029092 A1* | 1/2023 | Klimov | ................... | G06N 3/045 |
| 2024/0013564 A1* | 1/2024 | Kim | ...................... | G06V 10/454 |
| 2024/0118702 A1* | 4/2024 | Cella | .................. | G06Q 10/0635 |
| 2024/0178989 A1* | 5/2024 | Dolev | ...................... | G06N 3/02 |
| 2024/0340091 A1* | 10/2024 | Bourennane | .......... | H04B 10/70 |

OTHER PUBLICATIONS

Romero et al., "Quantum Autoencoders for Efficient Compression of Quantum Data", Aug. 18, 2017, Quantum Science Tech. 2, pp. 1-12 (Year: 2017).*
Al-Mohammed, "Quantum Key Distribution with Application to IOT Security", Jun. 2021, pp. 1-87. (Year: 2021).*

(Continued)

*Primary Examiner* — Paulinho E Smith
(74) *Attorney, Agent, or Firm* — NORTON ROSE FULBRIGHT US LLP

(57) ABSTRACT

A computer-implemented approach for integrating quantum computing elements into a neural network architecture, the neural network including an encoder and a decoder, the encoder being used to encode data input into the neural network and the decoder being used to at least partially reconstruct the encoded data. The encoder features at least one layer made up of quantum-based processors and at least one layer made up of non-quantum-based processors. This approach allows for extremely secure data transfer with high data compression.

13 Claims, 4 Drawing Sheets

(56)     References Cited

OTHER PUBLICATIONS

Botsinis et al., "Quantum Search Algorithms, Quantum Wireless, and a Low-Complexity Maximum Likelihood Iterative Quantum Multi-User Detector Design", May 10, 2013, IEEE Access, pp. 94-122 (Year: 2013).*

Khoshaman et al., "Quantum Variational Autoencoder", Jan. 12, 2019, arXiv.com, pp. 1-13. (Year: 2019).*

Sleeman et al., "A Hybrid Quantum Enabled RBM Advantage: Convolutional Autoencoders for Quantum Image Compression and Generative Learning", Jan. 21, 2020, arXiv.com, pp. 1-15 (Year: 2020).*

* cited by examiner

METHOD AND DEVICE FOR PROCESSING DATA ASSOCIATED WITH A NEURAL NETWORK

FIELD

The present invention relates to a method for processing data associated with a neural network.

Moreover, the present invention relates to a device for processing data associated with a neural network.

SUMMARY

Exemplary specific embodiments of the present invention relate to a method, for example a computer-implemented method, for processing data associated with a, for example artificial, neural network, the neural network including an encoder for encoding first data and a decoder for decoding data that are encoded with the aid of the encoder, for example for at least partially reconstructing the first data, at least one layer of the encoder including at least one processing element based on quantum bits, the method including: encoding the first data with the aid of the encoder, for example the at least one processing element based on quantum bits being used for the encoding. In further exemplary specific embodiments, an encryption, for example a secure encryption, is thus achievable with the aid of the encoder, for example.

In further exemplary specific embodiments of the present invention, the neural network includes multiple layers, for example more than two layers, and is thus designed as a deep neural network (DNN), for example.

For example, the encoder may include two or more layers, for example, among them, for example, an input layer that is designed, for example, for receiving input data, for example the first data. For example, the decoder may include, for example, one or multiple layers, for example also an output layer for outputting data that are processed with the aid of the DNN.

In further exemplary specific embodiments of the present invention, one or multiple inner or hidden layers of the DNN include fewer processing elements than do(es) the input layer and/or the output layer.

In further exemplary specific embodiments of the present invention, the processing elements may also be referred to as neurons, for example artificial neurons.

In further exemplary specific embodiments of the present invention, it is provided that the method includes: decoding the data that are encoded with the aid of the encoder.

In further exemplary specific embodiments of the present invention, it is provided that at least one layer of the encoder includes the at least one processing element based on quantum bits, for example the at least one layer of the encoder being formed, for example completely, from processing elements based on quantum bits. In further exemplary specific embodiments, it is thus made possible to carry out the encoding based on or using the processing elements based on quantum bits, which enhances security.

In further exemplary specific embodiments of the present invention, it is provided that at least one layer of the decoder includes at least one processing element based on quantum bits, for example the at least one layer of the decoder being formed, for example completely, from processing elements based on quantum bits.

In further exemplary specific embodiments of the present invention, it is provided that at least one layer of the neural network is made up, at least in part, of processing elements based on quantum bits, for example processing elements based on quantum bits as well as other processing elements not based on quantum bits, for example.

In further exemplary specific embodiments of the present invention, it is provided that at least one layer of the neural network is made up completely of processing elements based on quantum bits.

In further exemplary specific embodiments of the present invention, it is provided that the method includes: using the neural network as an autoencoder, for example a) for generating a compressed representation for the first data, for example with the aid of the encoder, and/or b) for at least partially reconstructing the first data, for example with the aid of the decoder, for example based on the compressed representation for the first data, and optionally training the autoencoder, for example with the aid of a conventional training method for autoencoders.

In further exemplary specific embodiments of the present invention, it is provided that the method includes: encrypting a message with the aid of the encoder, an encrypted message being obtained, and optionally sending the encrypted message, for example via a quantum channel.

In further exemplary specific embodiments of the present invention, it is provided that the method includes: decrypting a or the encrypted message with the aid of the decoder, and optionally receiving the encrypted message prior to the decrypting, for example via a or the quantum channel.

Further exemplary specific embodiments of the present invention relate to a device for carrying out at least some aspects of the method (for example, the encoding and/or the decoding) according to the specific embodiments.

In further exemplary specific embodiments of the present invention, it is provided that the device includes a quantum computer that is designed, for example, for implementing the at least one processing element based on quantum bits.

Further exemplary specific embodiments of the present invention relate to a sender for sending encrypted messages, including at least one device according to the specific embodiments.

Further exemplary specific embodiments of the present invention relate to a receiver for receiving encrypted messages, including at least one device according to the specific embodiments.

Further exemplary specific embodiments of the present invention relate to a computer-readable memory medium, including commands which, when executed by a computer, prompt the computer to carry out the method according to the specific embodiments.

Further exemplary specific embodiments of the present invention relate to a computer program, including commands which, when the program is executed by a computer, prompt the computer to carry out the method according to the specific embodiments.

Further exemplary specific embodiments of the present invention relate to a data carrier signal that transfers and/or characterizes the computer program according to the specific embodiments.

Further exemplary specific embodiments of the present invention relate to a use of the method according to the specific embodiments and/or of the device according to the specific embodiments and/or of the sender according to the specific embodiments and/or of the receiver according to the specific embodiments and/or of the computer-readable memory medium according to the specific embodiments and/or of the computer program according to the specific embodiments and/or of the data carrier signal according to the specific embodiments for at least one of the following elements: a) encrypting data, for example messages, b) decrypting data, for example messages, c) exchanging, for example sending and/or receiving, data, for example messages, for example via a quantum channel, d) compressing data, e) detecting anomalies, f) impeding or defeating attacks, for example man-in-the-middle attacks, g) processing images, h) combining a, for example, highly efficient encoding or compression of data with aspects of quantum cryptography.

Further features, application options, and advantages of the present invention result from the following description of exemplary embodiments of the present invention, illustrated in the figures. All described or illustrated features, alone or in any arbitrary combination, constitute the subject matter of the present invention, regardless of their wording or illustration in the description or drawings, respectively.

DETAILED DESCRIPTION OF EXAMPLE EMBODIMENTS

Figure 1:
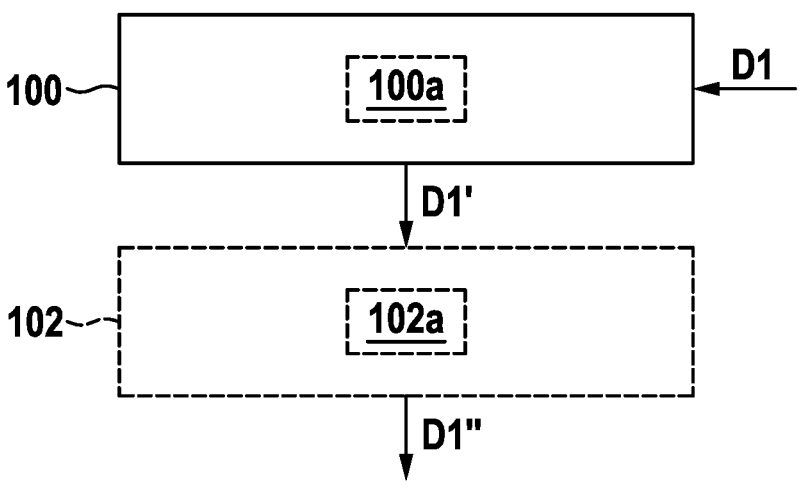
FIG. 1 schematically shows a simplified flowchart according to exemplary specific embodiments of the present invention.

Exemplary specific embodiments (cf. FIGS. 1 and 2) relate to a method, for example a computer-implemented method, for processing data associated with a, for example artificial, neural network NN (FIG. 2), neural network NN including an encoder ENC for encoding first data D1, and a decoder DEC for decoding data D1' that are encoded with the aid of encoder ENC, for example for at least partially reconstructing first data D1, at least one layer L3 of encoder ENC including at least one processing element VE-1, VE-2, VE-3 based on quantum bits, the method including: encoding 100 first data D1 with the aid of encoder ENC, for example the at least one processing element VE-1, VE-2, VE-3 based on quantum bits being used for encoding 100 (cf. block 100a according to FIG. 1). In further exemplary specific embodiments, an encryption, for example a secure encryption, is thus achievable with the aid of encoder ENC, for example. In other words, encoded data D1' that are ascertained by encoder ENC based on first data D1 may also be regarded as encrypted data D1' in further exemplary specific embodiments.

In further exemplary specific embodiments, neural network NN includes multiple layers L1, L2, L3, L4, L5, for example more than two layers, and is thus designed as a deep neural network DNN, for example. In further exemplary specific embodiments, more, for example many more, layers are possible than layers L1 through L5 depicted by way of example in the present case in FIG. 2.

For example, encoder ENC may include two or more layers L1, L2, L3, for example, among them, for example, an input layer L1 that is designed, for example, for receiving input data, for example first data D1. For example, decoder DEC may include, for example, one or multiple layers L4, L5, for example also an output layer L5 for outputting data D1" that are processed with the aid of DNN NN, and which may be, at least in part, reconstructed first data D1, for example.

In further exemplary specific embodiments, one or multiple inner or hidden layers L2, L3, L4 of DNN NN include fewer processing elements than do(es) input layer L1 and/or output layer L5, a dimension reduction, for example, being achievable.

In further exemplary specific embodiments, the processing elements of DNN NN may be referred to as neurons, for example artificial neurons. In further exemplary specific embodiments, at least one layer may also include more, for example many more, processing elements than those symbolized by circles in FIG. 2 by way of example.

In further exemplary specific embodiments, FIG. 1, it is provided that the method includes: decoding 102 data D1' that are encoded with the aid of encoder ENC, for example for an at least partial reconstruction.

Figure 2:
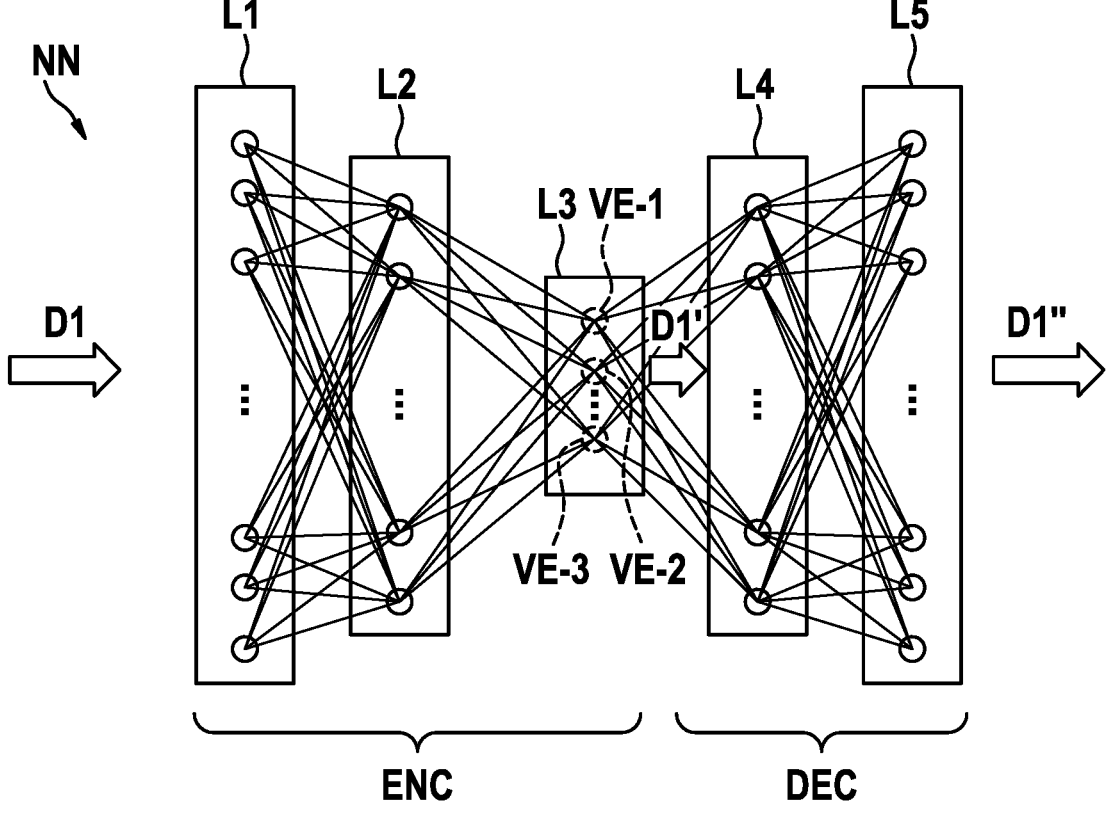
FIG. 2 schematically shows a simplified block diagram according to further exemplary specific embodiments of the present invention.

In further exemplary specific embodiments, FIG. 2, it is provided that at least one layer L3 of encoder ENC includes the at least one processing element based on quantum bits, in the present case, for example, three explicitly shown processing elements VE-1, VE-2, VE-3 based on quantum bits, for example the at least one layer L3 of encoder ENC, being formed, for example completely, from processing elements based on quantum bits; cf. the three points between the examples of processing elements VE-2, VE-3. In further exemplary specific embodiments, it is thus made possible to carry out encoding 100 (FIG. 1) based on or using the processing elements based on quantum bits, which enhances security.

In DNN NN depicted in FIG. 2 by way of example, layer L3 includes processing elements based on quantum bits, symbolized by dashed-line circles VE-1, VE-2, VE-3, while further layers L1, L2, L4, L5, for example, include no processing elements based on quantum bits, symbolized by unlabeled circles that are depicted by solid lines.

Figure 3:
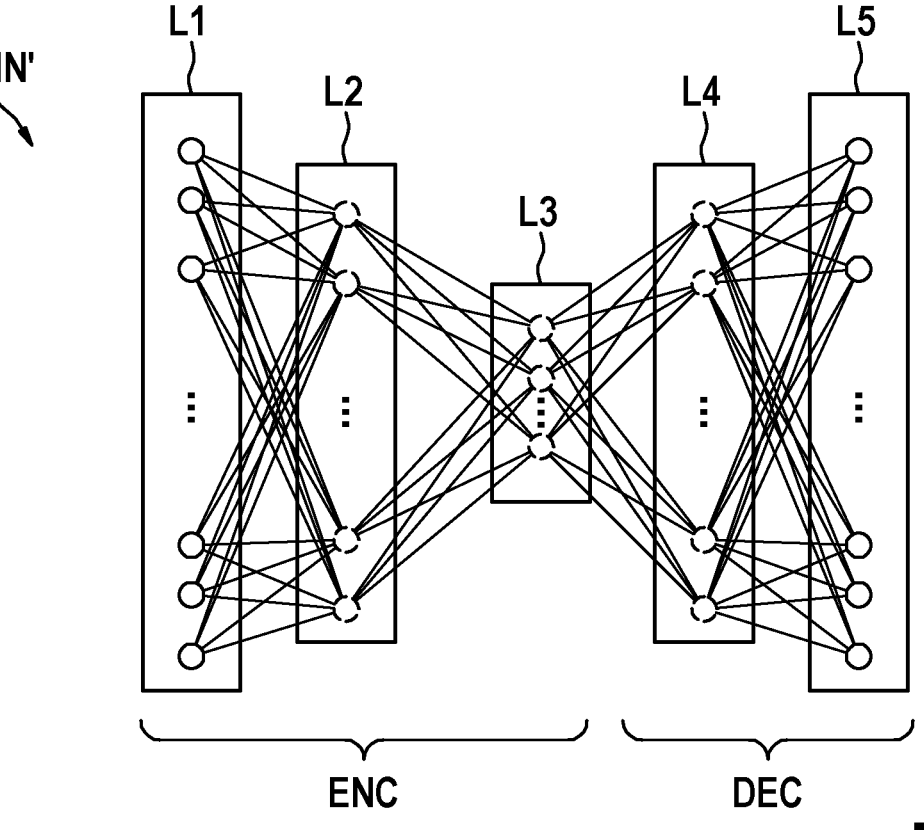
FIG. 3 schematically shows a simplified block diagram according to further exemplary specific embodiments of the present invention.

In further exemplary specific embodiments (cf. DNN NN' according to FIG. 3), it is provided that at least one layer L4 of decoder DEC includes at least one processing element based on quantum bits, for example the at least one layer L4 of decoder DEC being formed, for example completely, from processing elements based on quantum bits (cf. the dashed-line circles of layer L4). As an example, layers L2, L3 of DNN NN' according to FIG. 3 likewise include processing elements based on quantum bits, but further layers L1, L5, for example, do not.

In further exemplary specific embodiments, it is provided that at least one layer of the neural network is made up, at least in part, of processing elements based on quantum bits, for example processing elements based on quantum bits as well as other processing elements not based on quantum bits, for example, as the result of which hybrid layers ("mix-type layers"), for example, are also achievable.

In further exemplary specific embodiments, it is provided that at least one layer L3 of neural network NN' is made up completely of processing elements VE-1, . . . , VE-3 based on quantum bits.

Figure 4:
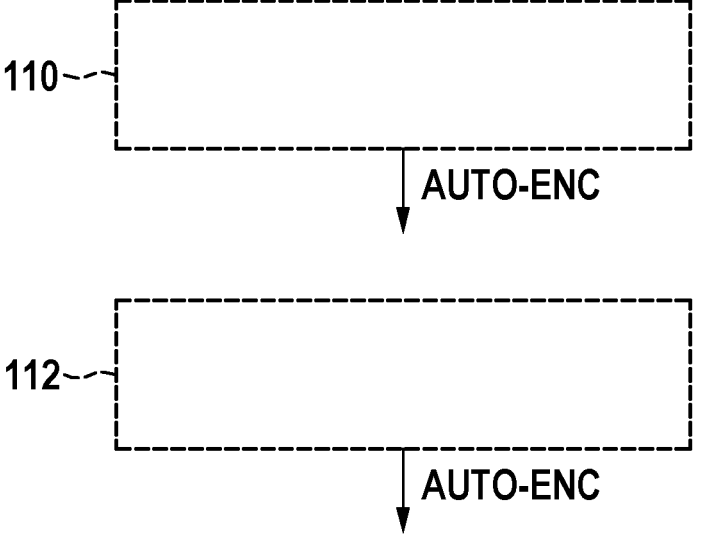
FIG. 4 schematically shows a simplified flowchart according to exemplary specific embodiments of the present invention.

In further exemplary specific embodiments, FIG. 4, it is provided that the method includes: using 110 neural network NN, NN' as an autoencoder AUTO-ENC, for example a) for generating a compressed representation D1' for first data D1, for example with the aid of encoder ENC, and/or b) for at least partially reconstructing first data D1, for example with the aid of decoder DEC, for example based on compressed representation D1' for first data D1, and optionally training 112 autoencoder AUTO-ENC, for example with the aid of a conventional training method for autoencoders.

In further exemplary specific embodiments, it is provided that, for example after autoencoder AUT-ENC has been trained, a sender 10 (cf. below in the description of FIG. 7) encrypts a message N1 to be sent, using encoder ENC, and transfers encrypted message N1' thus generated to a receiver 20 via a secure quantum channel QK. Due to the protection against eavesdropping on quantum channel QK according to further specific embodiments, the encrypted message may be transported to the receiver securely and without distortion, and the receiver may then decrypt the message, for example with the aid of decoder DEC. In further exemplary specific embodiments, for example an absolutely secure data transfer, for example with high data compression, is thus achievable.

Figures 5, 6:
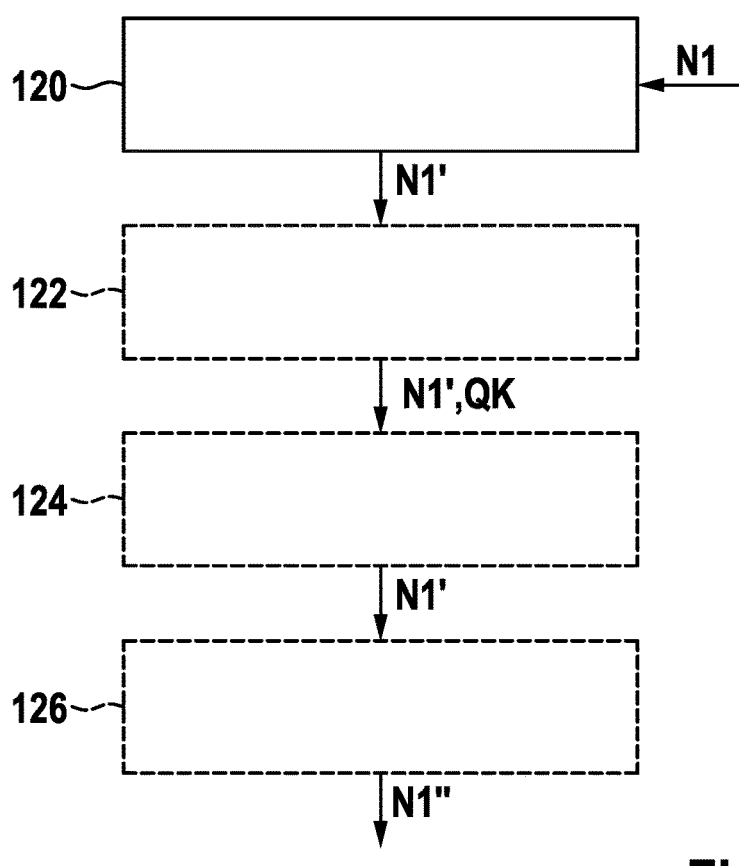
FIG. 5 schematically shows a simplified flowchart according to exemplary specific embodiments of the present invention.
FIG. 6 schematically shows a simplified block diagram according to exemplary specific embodiments of the present invention.
Figure 7:
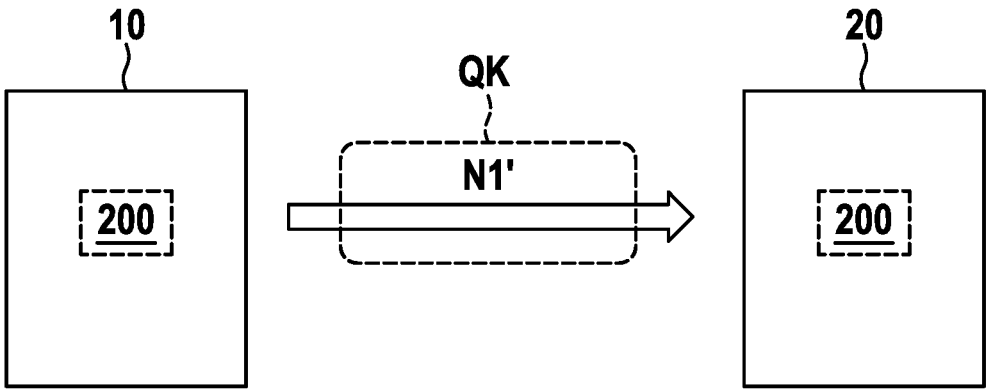
FIG. 7 schematically shows a simplified block diagram according to exemplary specific embodiments of the present invention.

In further exemplary specific embodiments, FIG. 5, it is accordingly provided that the method includes: encrypting 120 a message N1 with the aid of encoder ENC, an encrypted message N1' being obtained, and optionally sending 122 encrypted message N1', for example via a quantum channel QK (cf. FIG. 7).

In further exemplary specific embodiments, FIG. 5, it is provided that the method includes: decrypting 126 a or the encrypted message N1' with the aid of decoder DEC, and optionally receiving 124 encrypted message N1' prior to decrypting 126, for example via a or the quantum channel.

Further exemplary specific embodiments, FIG. 6, relate to a device 200 for carrying out the method according to the specific embodiments.

In further exemplary specific embodiments, it is provided that device 200 includes: a computer 202 that includes at least one processor core 202a, 202b, a memory device 204, associated with computer 202, for at least temporarily storing at least one of the following elements: a) data DAT (for example, first data D1, and/or encrypted data D1' and/or reconstructed data D1"), b) computer program PRG, for example for carrying out the method according to the specific embodiments.

In further exemplary specific embodiments, memory device 204 includes a volatile memory (a working memory (RAM), for example) 204a and/or a nonvolatile memory (NVM) 204b (flash EEPROM, for example), or a combination thereof or with other types of memories not explicitly stated.

In further exemplary specific embodiments, it is provided that device 200 includes a quantum computer 203 that is designed, for example, for implementing the at least one processing element VE-1, VE-2, VE-3 based on quantum bits QB (FIG. 2).

In further exemplary specific embodiments, for example aspects of DNN NN, NN' that are associated with nonquantum-based processing elements may be evaluated with the aid of computer 202, and for example aspects of DNN NN, NN' that are associated with quantum-based processing elements may be evaluated with the aid of quantum computer 203.

Further exemplary specific embodiments relate to a computer-readable memory medium SM, including commands PRG which, when executed by a computer 202, 203, prompt the computer to carry out the method according to the specific embodiments.

Further exemplary specific embodiments relate to a computer program PRG that includes commands which, when program PRG is executed by a computer 202, 203, prompt the computer to carry out the method according to the specific embodiments.

Further exemplary specific embodiments relate to a data carrier signal DCS that characterizes and/or transfers computer program PRG according to the specific embodiments. Data carrier signal DCS is receivable, for example, via an optional data interface 206 of device 200. For example, data DAT, D1, D1', D1" are likewise transferable (able to be sent and/or received) via optional data interface 206.

Further exemplary specific embodiments, FIG. 7, relate to a sender 10 for sending encrypted messages N1', including at least one device 200 according to the specific embodiments. For example, in further exemplary specific embodiments, sender 10 may use encoder ENC of DNN NN, NN' in order to encrypt a message N1 (FIG. 5). For example, in further exemplary specific embodiments, sender 10 may send encrypted message N1' via a quantum channel QK, for example to a receiver 20.

Further exemplary specific embodiments, FIG. 7, relate to a receiver 20 for receiving encrypted messages N1', including at least one device 200 according to the specific embodiments. For example, in further exemplary specific embodiments, receiver 20 may use decoder DEC of DNN NN, NN' in order to decrypt a received encrypted message N1'. For example, in further exemplary specific embodiments, receiver 20 may receive encrypted message N1' via quantum channel QK, for example from sender 10.

In further exemplary specific embodiments, sender 10 may be designed, for example, to carry out the function of encoder ENC (FIG. 3) but not the function of decoder DEC, for example. For example, in this case device 200 of sender 10 may be designed to carry out the function of encoder ENC (FIG. 3), but not the function of decoder DEC.

In further exemplary specific embodiments, receiver 20 may be designed, for example, to carry out the function of decoder DEC (FIG. 3), but not the function of encoder ENC, for example. For example, in this case device 200 of receiver 20 may be designed to carry out the function of decoder DEC (FIG. 3), but not the function of encoder ENC, for example.

Figure 8:
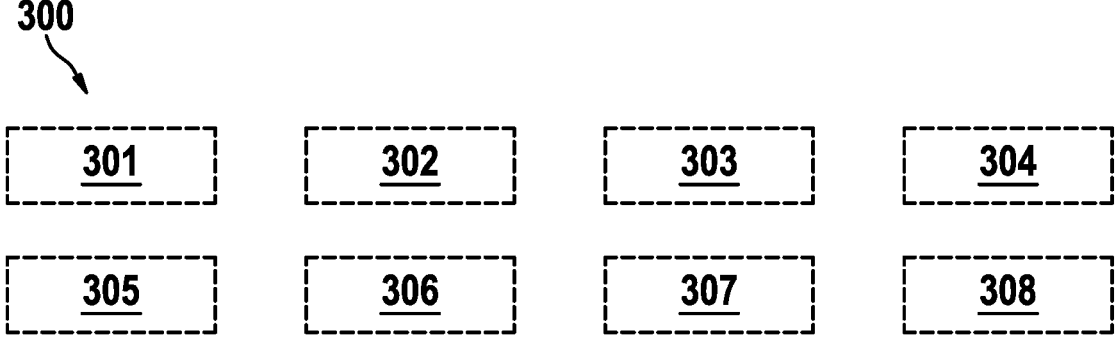
FIG. 8 schematically shows aspects of uses according to exemplary specific embodiments of the present invention.

Further exemplary specific embodiments, FIG. 8, relate to a use 300 of the method according to the specific embodiments and/or of device 200 according to the specific embodiments and/or of sender 10 according to the specific embodiments and/or of receiver 20 according to the specific embodiments and/or of computer-readable memory medium SM according to the specific embodiments and/or of computer program PRG according to the specific embodiments and/or of data carrier signal DCS according to the specific embodiments for at least one of the following elements: a) encrypting 301 data DAT, D1, for example messages N1, b) decrypting 302 data D1', for example messages N1', c) exchanging 303, for example sending and/or receiving, data, for example messages, for example via a quantum channel QK (FIG. 7), d) compressing 304 data, e) detecting anomalies 305, f) impeding 306 or defeating attacks, for example man-in-the-middle attacks, g) processing images 307, h) combining 308 a, for example, highly efficient encoding or compression of data with aspects of quantum cryptography.

In further exemplary specific embodiments, the principle according to the specific embodiments may be utilized, for example, to compress data D1, N1 in such a way that with, for example, a comparatively small bandwidth, for example a comparatively high data volume may be securely transferred, for example via quantum cryptography.

Furthermore, the principle according to the specific embodiments provides, for example, strong, enhanced security, for example against man-in-the-middle attacks.

Moreover, the principle according to the specific embodiments may also be useful for other applications of autoencoders, such as anomaly detection and/or image processing.

In further exemplary specific embodiments, the principle according to the specific embodiments may be utilized, for example, to provide a hybrid architecture made up of an autoencoder AUTO-ENC and a quantum neural network. By use of this hybrid architecture, for example highly efficient data encoding is combinable with the advantages of secure quantum cryptography. In particular, in further exemplary specific embodiments, enhanced security, for example against man-in-the-middle attacks, which are not possible without knowledge of encoder ENC/decoder DEC, for example, is achievable.

What is claimed is:

1. A computer-implemented method for processing data associated with an artificial neural network, the neural network including an encoder configured to encode first data and a decoder configured to decode data that are encoded using the encoder for at least partially reconstructing the first data, the encoder including at least one first layer having at least one first processing element based on nonquantum bits, the encoder further including at least one second layer having at least one second processing element based on quantum bits, the method comprising:

encoding the first data using the encoder, the at least one first processing element based on nonquantum bits and the at least one second processing element based on quantum bits being used for the encoding.

2. The method as recited in claim 1, further comprising: decoding the data that are encoded using the encoder.

3. The method as recited in claim 1, wherein the at least one second layer of the encoder is formed completely from processing elements based on quantum bits.

4. The method as recited in claim 1, wherein at least one layer of the decoder includes at least one processing element based on quantum bits, the at least one layer of the decoder being formed completely from processing elements based on quantum bits.

5. The method as recited in claim 1, further comprising: using the neural network as an autoencoder a) for generating a compressed representation for the first data using the encoder, and/or b) for at least partially reconstructing the first data using the decoder based on the compressed representation for the first data.

6. The method as recited in claim 5, further comprising training the autoencoder.

7. The method as recited in claim 1, further comprising: encrypting a message using the encoder to obtain an encrypted message, and sending the encrypted message via a quantum channel.

8. The method as recited in claim 1, further comprising: decrypting an encrypted message using the decoder, and receiving the encrypted message prior to the decrypting, via a quantum channel.

9. A device configured to process data associated with an artificial neural network, the neural network including an encoder configured to encode first data and a decoder configured to decode data that are encoded using the encoder for at least partially reconstructing the first data, the encoder including at least one first layer having at least one first processing element based on nonquantum bits, the encoder further including at least one second layer having at least one second processing element based on quantum bits, the device configured to:

encode the first data using the encoder, the at least one first processing element based on nonquantum bits and the at least one second processing element based on quantum bits being used for the encoding.

10. The device as recited in claim 9, wherein the device includes a quantum computer that is configured to implement the at least one second processing element based on quantum bits.

11. The device as recited in claim 9, wherein the device is configured for at least one of the following elements: a) encrypting messages, b) decrypting messages, c) exchanging messages via a quantum channel, d) compressing data, e) detecting anomalies, f) impeding or defeating man-in-the-middle attacks, g) processing images, h) combining a highly efficient encoding or compression of data with aspects of quantum cryptography.

12. A sender configured to send encrypted messages, comprising:

a device configured to process data associated with an artificial neural network, the neural network including an encoder configured to encode first data and a decoder configured to decode data that are encoded using the encoder for at least partially reconstructing the first data, the encoder including at least one first layer having at least one first processing element based on nonquantum bits, the encoder further including at least one second layer having at least one second processing element based on quantum bits, the device configured to:

encode the first data using the encoder, the at least one first processing element based on nonquantum bits and the at least one second processing element based on quantum bits being used for the encoding.

13. A non-transitory computer-readable memory medium on which is stored commands for processing data associated with an artificial neural network, the neural network including an encoder configured to encode first data and a decoder configured to decode data that are encoded using the encoder for at least partially reconstructing the first data, the encoder including at least one first layer having at least one first processing element based on nonquantum bits, the encoder further including at least one second layer having at least one second processing element based on quantum bits, the commands, when executed by a computer, causing the computer to perform the following:

encoding the first data using the encoder, the at least one first processing element based on nonquantum bits and the at least one second processing element based on quantum bits being used for the encoding.

\* \* \* \* \*